United States Patent
Uno et al.

(10) Patent No.: US 12,144,091 B2
(45) Date of Patent: Nov. 12, 2024

(54) HIGH-FREQUENCY HEATING APPARATUS

(71) Applicant: Panasonic Intellectual Property Management Co., Ltd., Osaka (JP)

(72) Inventors: Takashi Uno, Shiga (JP); Fumitaka Ogasawara, Hyogo (JP); Motoyoshi Iwata, Osaka (JP); Shinji Takano, Kyoto (JP); Mikio Fukui, Shiga (JP); Daisuke Hosokawa, Shiga (JP); Masayoshi Hiramoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 531 days.

(21) Appl. No.: 17/251,955

(22) PCT Filed: Jul. 25, 2019

(86) PCT No.: PCT/JP2019/029119
§ 371 (c)(1),
(2) Date: Dec. 14, 2020

(87) PCT Pub. No.: WO2020/026930
PCT Pub. Date: Feb. 6, 2020

(65) Prior Publication Data
US 2021/0267027 A1    Aug. 26, 2021

(30) Foreign Application Priority Data
Jul. 31, 2018   (JP) .................. 2018-143141

(51) Int. Cl.
*H05B 6/68* (2006.01)
*H05B 6/64* (2006.01)
*H05B 6/72* (2006.01)

(52) U.S. Cl.
CPC ........... *H05B 6/687* (2013.01); *H05B 6/6438* (2013.01); *H05B 6/6452* (2013.01); *H05B 6/686* (2013.01); *H05B 6/72* (2013.01)

(58) Field of Classification Search
CPC .... H05B 6/6438; H05B 6/645; H05B 6/6452; H05B 6/68; H05B 6/686; H05B 6/687; H05B 6/705; H05B 6/72; Y02B 40/00
(Continued)

(56) References Cited

U.S. PATENT DOCUMENTS 5,521,360 A * 5/1996 Johnson ................. H05B 6/705
                                                      219/709
5,837,978 A   11/1998 Hatzakis, Jr. et al.
(Continued)

FOREIGN PATENT DOCUMENTS

CN    105972651    9/2016
JP    58-045415    3/1983
(Continued)

OTHER PUBLICATIONS

Extended European Search Report issued Jul. 28, 2021 in related European Patent Application No. 19843424.3.
(Continued)

*Primary Examiner* — Quang T Van
(74) *Attorney, Agent, or Firm* — Wenderoth, Lind & Ponack, L.L.P.

(57) ABSTRACT

A high-frequency heating apparatus includes: a heating chamber for accommodating a load; a microwave source; at least one radiator; a temperature detector; and a controller. The microwave source generates a microwave and adjusts the frequency and output of the microwave. The at least one radiator radiates a microwave into the heating chamber. The temperature detector detects the temperature in the heating chamber. The controller causes the microwave source to
(Continued)

adjust the output of the microwave based on the temperature profile that defines the temperature change in the load, and the temperature in the heating chamber. According to this aspect, food can be heated in accordance with the temperature profile appropriate for the cooking recipe, thereby ensuring the quality of cooked food.

8 Claims, 5 Drawing Sheets

(58) Field of Classification Search
USPC ........ 219/690–701, 705, 709, 710, 711, 746, 219/756, 757, 758, 770, 771, 716, 761
See application file for complete search history.

(56) References Cited

U.S. PATENT DOCUMENTS

| | | | |
|---|---|---|---|
| 6,150,645 | A | 11/2000 | Lewis et al. |
| 6,462,320 | B1 | 10/2002 | Fuls et al. |
| 10,071,521 | B2* | 9/2018 | Chen .................. H05B 6/707 |
| 2006/0081624 | A1 | 4/2006 | Takada et al. |
| 2010/0176121 | A1* | 7/2010 | Nobue .................. H05B 6/686 |
| | | | 219/716 |
| 2010/0176123 | A1* | 7/2010 | Mihara .................. H05B 6/705 |
| | | | 219/746 |
| 2015/0118368 | A1 | 4/2015 | Lin |

FOREIGN PATENT DOCUMENTS

| | | |
|---|---|---|
| JP | 60-136196 | 7/1985 |
| JP | 4-056092 | 2/1992 |
| JP | 5-087344 | 4/1993 |
| JP | 5-303993 | 11/1993 |
| JP | 6-088619 | 3/1994 |
| JP | 2000-500912 | 1/2000 |
| JP | 2006-128075 | 5/2006 |
| WO | 2012/109634 | 8/2012 |

OTHER PUBLICATIONS

Chinese Search Report issued Apr. 12, 2023 in corresponding Chinese Patent Application No. 201980048575.1.
International Search Report of PCT application No. PCT/JP2019/029119 dated Oct. 21, 2019.

* cited by examiner

HIGH-FREQUENCY HEATING APPARATUS

TECHNICAL FIELD

The present disclosure relates to a high-frequency microwave heating apparatus.

BACKGROUND ART

Well-known high-frequency heating apparatuses measure the initial temperature of food using an infrared sensor to determine whether the food is at room temperature or frozen. These apparatuses control the output power of a magnetron, which is the microwave source so that the food can be heated in low power mode when it is frozen and can be heated in full power mode when it is at room temperature (e.g., Patent Literature 1).

In general, when thawing food, low power mode is selected to ensure heating uniformity, whereas when heating food, full power mode is selected to reduce heating time. Frozen food is thawed and heated in the following manner. First, a thawing process is started in full power mode for food whose temperature is −20° C. When the food approaches 0° C., the mode is switched to low power mode, and when the food is completely thawed, the mode is switched back to full power mode.

Furthermore, there is a known technique to determine the state of food, which is a load, based on the reflection energy coming from the heating chamber (e.g., Patent Literature 2). This technique controls heating based on the fact that food produces high reflection energy when it is frozen and produces lower reflection energy as it is being thawed. This can prevent food from being overheated.

CITATION LIST

Patent Literature

PTL 1: Japanese Unexamined Patent Application Publication No. 5-87344
PTL 2: Japanese Unexamined Patent Application Publication No. 4-56092

SUMMARY OF THE INVENTION

Such well-known techniques can heat food up to desired temperatures using the functions of thawing and heating. However, the temperature control is not precise enough for different types of food or cooking recipes, possibly causing variations in the mouthfeel or the quality of cooked food.

For example, when heating beef, proteins such as myosin and collagen begin to denature at 50° C. to 56° C., making the beef tender and soft. Meanwhile, actin begins to denature at 66° C. or higher, removing moisture that is a source of meat juice from the beef, thereby extremely degrading the quality of the cooked beef.

Cooking at low temperature such as cooking roast beef requires fine control of the output power, for example, keeping a constant temperature of a little less than 60° C. for a certain time.

Patent Literature 1 describes the heating uniformity during thawing, but does not describe the control of the output power at a temperature higher than room temperature.

Patent Literature 2 describes a technique to calculate the energy required for heating and to stop the output power in order to prevent overheating during thawing, but does not describe the adjustment of the output power in order to achieve temperature changes appropriate for different types of food or cooking recipes.

An object of the present disclosure is to provide a high-frequency heating apparatus capable of adjusting the output of the microwave source so that the temperature of the food being cooked changes in accordance with the temperature profile that defines the temperature change in the food.

A microwave source composed of a semiconductor device can implement finer control of output and adjust a plurality of parameters such as oscillation frequency and phase. This can improve heating efficiency and heating uniformity.

A high-frequency heating apparatus according to an aspect of the present disclosure includes a heating chamber in which to accommodate a load, a microwave source, at least one radiator, a temperature detector, and a controller. The microwave source generates a microwave and adjusts the frequency and output of the microwave. The at least one radiator radiates the microwave into the heating chamber. The temperature detector detects the temperature in the heating chamber. The controller causes the microwave source to adjust the output of the microwave based on a temperature profile that defines the temperature change in the load, and the temperature in the heating chamber.

According to the aspect, food is heated in accordance with the temperature profile appropriate for the cooking recipe, thereby ensuring the quality of the cooked food.

According to the aspect, the microwave output is adjusted in accordance with the programmed temperature profile to control the load temperature, thereby ensuring the quality of the cooked food.

DESCRIPTION OF EMBODIMENTS

Figure 1:
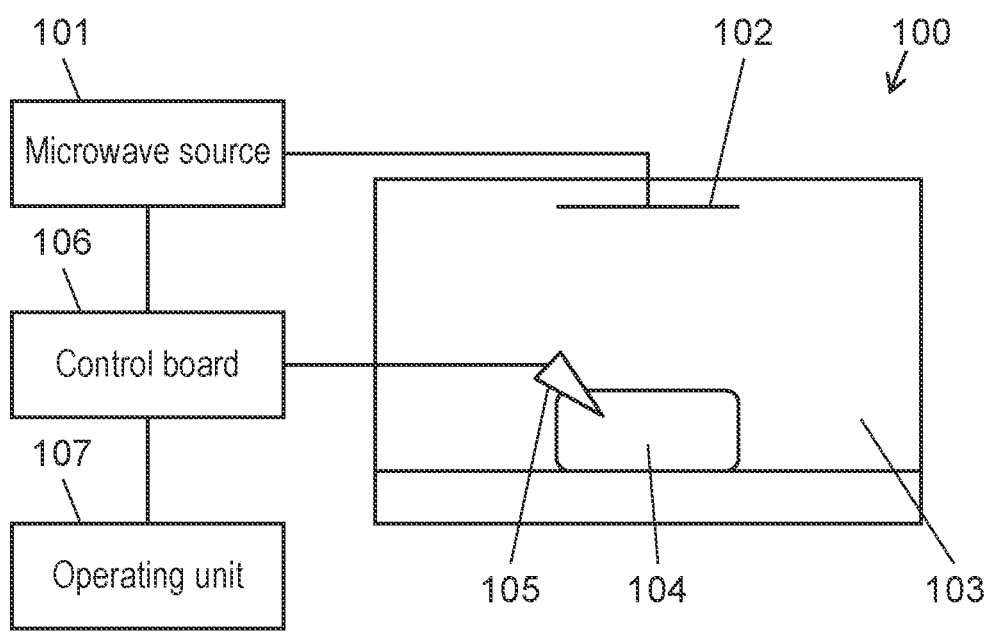
FIG. 1 is a structural block diagram of a high-frequency heating apparatus according to a first exemplary embodiment of the present disclosure.

The high-frequency heating apparatus according to the first aspect of the present disclosure includes: a heating chamber in which to accommodate a load; a microwave source; at least one radiator; a temperature detector; and a controller. The microwave source generates a microwave and adjusts the frequency and output of the microwave. The at least one radiator radiates the microwave into the heating chamber. The temperature detector detects the temperature in the heating chamber. The controller causes the microwave source to adjust the output of the microwave based on a temperature profile that defines the temperature change in the load, and the temperature in the heating chamber.

According to the first aspect, food is heated in accordance with the temperature profile appropriate for the cooking recipe, thereby ensuring the quality of the cooked food.

A high-frequency heating apparatus according to a second aspect of the present disclosure includes, in addition to the structure of the first aspect, an operating unit that receives a selection by a user. The controller determines the temperature profile to be implemented based on the selection by the user.

In a high-frequency heating apparatus according to a third aspect of the present disclosure, in addition to the structure of the first aspect, the controller causes the microwave source to change a cycle of adjusting the output of the microwave.

In a high-frequency heating apparatus according to a fourth aspect of the present disclosure, in addition to the structure of the first aspect, the controller causes the microwave source to adjust the frequency of the microwave at a cycle shorter than a cycle of adjusting the output of the microwave.

A high-frequency heating apparatus according to a fifth aspect of the present disclosure includes, in addition to the structure of the first aspect, a first power detector that detects transmission energy transmitted from the microwave source to the heating chamber, and a second power detector that detects reflection energy that returns from the heating chamber to the microwave source. The controller causes the microwave source to adjust the frequency of the microwave based on the transmission energy and the reflection energy.

In a high-frequency heating apparatus according to a six aspect of the present disclosure, in addition to the structure of the first aspect, the at least one radiator includes a plurality of radiators, and the microwave source adjust the relative phase of the plurality of microwaves radiated from the plurality of radiators.

In a high-frequency heating apparatus according to a seventh aspect of the present disclosure, in addition to the structure of the sixth aspect, the controller causes the microwave source to adjust the relative phase of the microwaves at a cycle shorter than the cycle of adjusting the output of the microwave.

A high-frequency heating apparatus according to an eighth aspect of the present disclosure includes, in addition to the structure of the sixth aspect, a first power detector that detects transmission energy transmitted from the microwave source to the heating chamber, and a second power detector that detects reflection energy that returns from the heating chamber to the microwave source. The controller causes the microwave source to adjust the relative phase of the plurality of microwaves based on the transmission energy and the reflection energy.

Embodiments of the present disclosure will now be described as follows with reference to the drawings.

First Exemplary Embodiment

FIG. 1 is a structural block diagram of high-frequency heating apparatus 100 according to a first exemplary embodiment of the present disclosure.

As shown in FIG. 1, high-frequency heating apparatus 100 includes: microwave source 101; heating chamber 103 where food 104 is placed as a load;

antenna 102, which is a radiator; temperature sensor 105, which is a temperature detector; control board 106, which is a controller; and operating unit 107.

Temperature sensor 105 detects the temperature of food 104. Control board 106, which is a circuit board including a microprocessor, adjusts the output of microwave source 101 based on the temperature of food 104. Operating unit 107 enables the user to select a cooking recipe.

Microwave source 101 includes a microwave oscillator and a variable gain amplifier, which are composed of a semiconductor device. The oscillator included in microwave source 101 generates a microwave having a frequency of 2.4 GHz to 2.5 GHz. The variable gain amplifier included in microwave source 101 amplifies the microwave generated by the oscillator to an arbitrary output value within a permissible range.

The microwave from microwave source 101 is radiated into heating chamber 103 by antenna 102. The radiated microwave heats food 104. Temperature sensor 105, which is a food probe, is inserted into food 104 to detect the internal temperature.

When the user selects a desired cooking recipe using operating unit 107, control board 106 determines the temperature profile appropriate for the recipe. The temperature profile defines the temperature change in food 104 suitable for the cooking recipe, and the entire cooking time of the recipe.

Control board 106 causes microwave source 101 to generate the microwave having the frequency and the output such that the temperature change in food 104 from the beginning of the cooking process agrees with the temperature change that is defined in the programmed temperature profile. Hence, the selected recipe is implemented.

Figure 2:
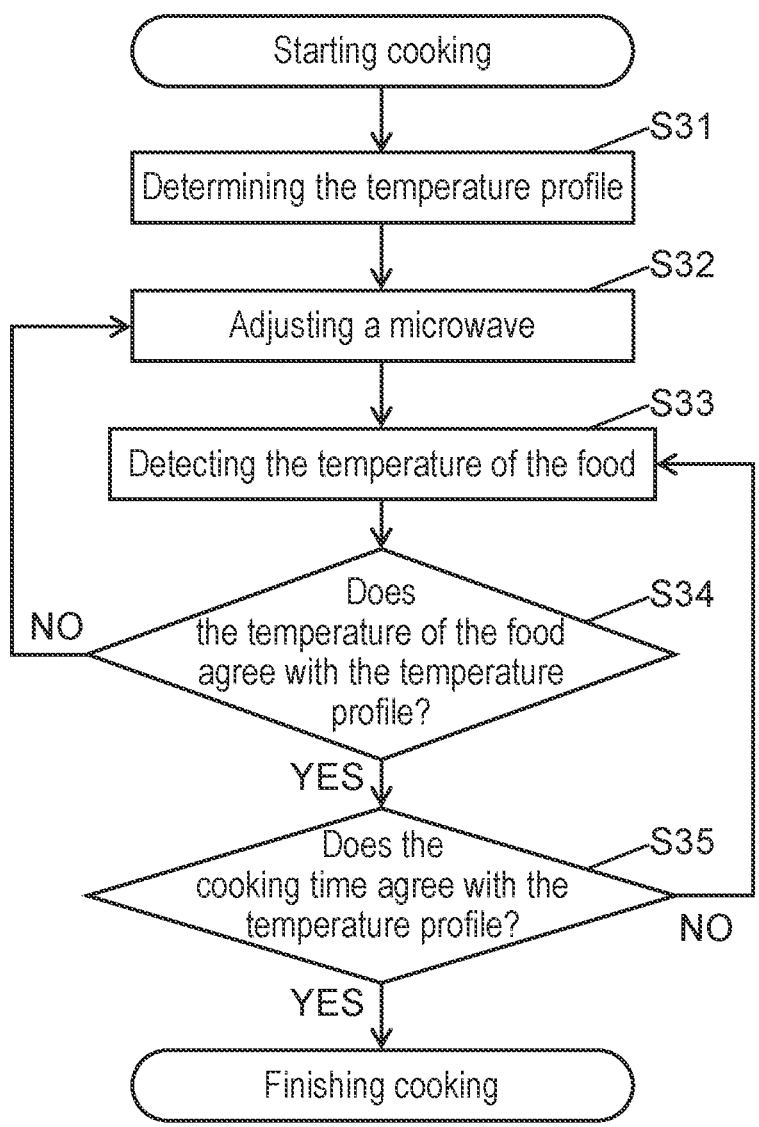
FIG. 2 is a control flowchart of the high-frequency heating apparatus according to the first exemplary embodiment.

FIG. 2 is a control flowchart of high-frequency heating apparatus 100. As shown in FIG. 2, when the user selects a cooking recipe with operating unit 107 in Step S31, control board 106 refers to the data table and determines the temperature profile to be implemented based on the selected recipe.

In Step S32, control board 106 causes microwave source 101 to operate under specified initial output conditions that are appropriate for the predetermined temperature profile. Microwave source 101 outputs a microwave appropriate for the initial output conditions. The initial output conditions of the microwave in the temperature increasing process (a) can be, for example, a frequency of 2.45 GHz and an output value of 500 W.

In Step S33, control board 106 monitors the temperature of food 104 based on the signal detected by temperature sensor 105, for example, every one second. In Step S34, control board 106 determines whether the temperature of food 104 agrees with that defined in the temperature profile.

If the temperature of food 104 fails to agree with that defined in the temperature profile (No in Step S34), the process returns from Step S34 to Step S32. For example, when the temperature of food 104 is lower than the temperature defined in the temperature profile, control board 106, for example, increases the output of microwave source 101 to 600 W in Step S32 so as to accelerate the heating of food 104. If food 104 easily absorbs a microwave having a frequency of 2.47 GHz, control board 106 may change the microwave frequency to 2.47 GHz.

If the temperature of food 104 agrees with that defined in the temperature profile (Yes in Step S34), the process proceeds from Step S34 to Step S35. In Step S35, control board 106 determines whether the time elapsed since the start of the cooking has reached the cooking time defined in the temperature profile. If the result in Step S35 is "No", the process returns to Step S33. If the result is "Yes", control board 106 ends the cooking.

Thus, in Steps S32 to S35, control board 106 controls microwave source 101 so that the temperature of food 104 changes as defined in the temperature profile during the heating time defined in the temperature profile.

Figure 3A:
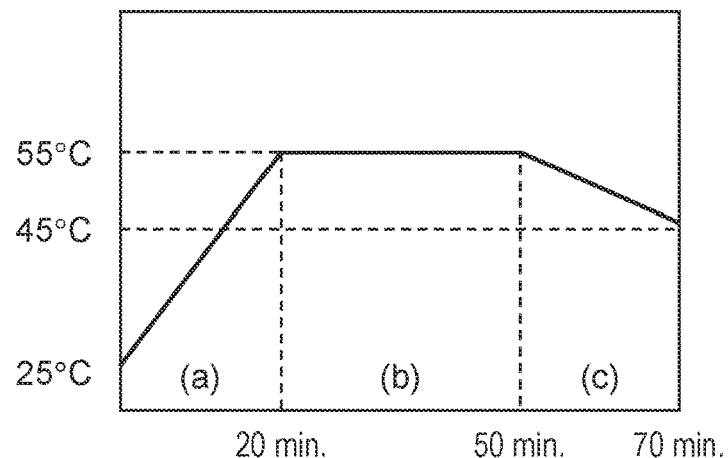
FIG. 3A shows a temperature profile.

FIG. 3A shows an example of the temperature profile. The temperature profile shown in FIG. 3A is for cooking roast beef. The profile defines performing the following sequential processes: a temperature increasing process (a), a constant temperature process (b), and a temperature decreasing process (c).

In the temperature increasing process (a), control board 106 allows food 104 to be heated for 20 minutes to increase its temperature from room temperature to 55° C. When the temperature of food 104 reaches 55° C. after the 20 minutes, the process proceeds to the constant temperature process (b).

In the constant temperature process (b), control board 106 causes microwave source 101 to decrease the output of the microwave or to change the frequency of the microwave. Thus, food 104 is kept at a comparatively low temperature of 55° C. for 30 minutes.

When food 104 is kept at a constant temperature as in the constant temperature process (b), microwave source 101 may repeat operating and stopping. This method, however, may increase the error from the target temperature of 55° C., making it difficult to achieve fine temperature control, which influences the quality of cooked food. Therefore, the output of microwave source 101 is preferably set at a low level to reduce temperature variations in the constant temperature process (b).

When 50 minutes have passed since the start of the cooking, the process proceeds to the temperature decreasing process (c). In this process (c), control board 106 decreases the temperature of food 104 to 45° C. in 20 minutes.

The gradual temperature change in the temperature decreasing process (c) is achieved not by simply stopping microwave source 101 but by setting the output of microwave source 101 at a low level. For example, to absorb liquid seasoning into food 104, heating is stopped to reduce convection. In general, however, liquid seasoning is more easily absorbed into food 104 as food 104 is at higher temperature. For this reason, microwave source 101 preferably continues to generate a microwave having the output that is low enough to avoid convection.

The temperature profile may define that when food 104 is at high temperature, the output of microwave source 101 is stopped to let food 104 rest until cool enough to be taken out safely.

As described above, the present exemplary embodiment programs a temperature profile appropriate for the cooking recipe selected by the user, and adjusts the output of microwave source 101 according to the temperature of food 104. This enables the temperature of food 104 to change in accordance with the temperature profile, thereby ensuring the quality of the cooked food.

In the present exemplary embodiment, a food probe as temperature sensor 105 is used to detect the internal temperature of food 104. Alternatively, however, an infrared sensor may be used to detect the surface temperature of food 104.

In the temperature increasing process (a), when the volume of food 104 is large, food 104 may fail to be heated to the temperature defined in the temperature profile even if microwave source 101 is operated at maximum output power. In such a case, control board 106 may extend the temperature increasing process (a) until food 104 is heated to the temperature defined in the temperature profile.

Similarly, in the temperature decreasing process (c), food 104 may not be cooled to the temperature defined in the temperature profile even if the output of microwave source 101 is stopped. In such a case, control board 106 may extend the temperature decreasing process (c) until food 104 is cooled to the temperature defined in the temperature profile.

A temperature profile may define a plurality of temperature change processes such as the temperature increasing process (a) and the constant temperature process (b) shown in FIG. 3A. In such a case, control board 106 may extend the cycle of adjusting the output of microwave source 101 in the temperature increasing process (a) by giving priority to the heating rate. Control board 106 may reduce the cycle of adjusting the output of microwave source 101 in the constant temperature process (b) by giving priority to the precision of the temperature control of food 104. This can reduce the cooking time and further ensure the quality of the cooked food.

Figure 3B:
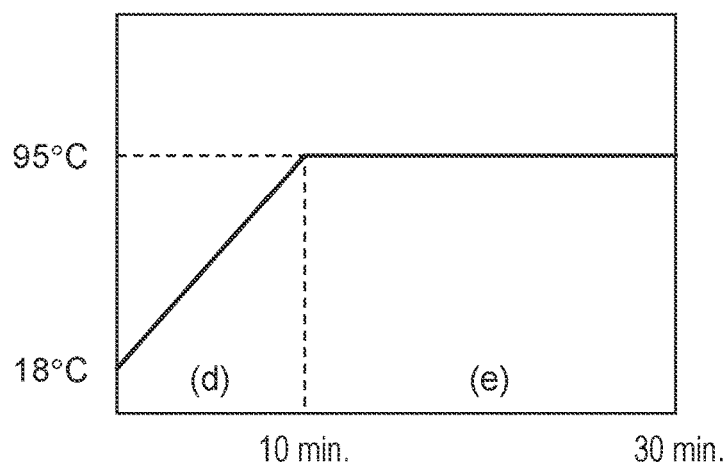
FIG. 3B shows another temperature profile.
Figure 3C:
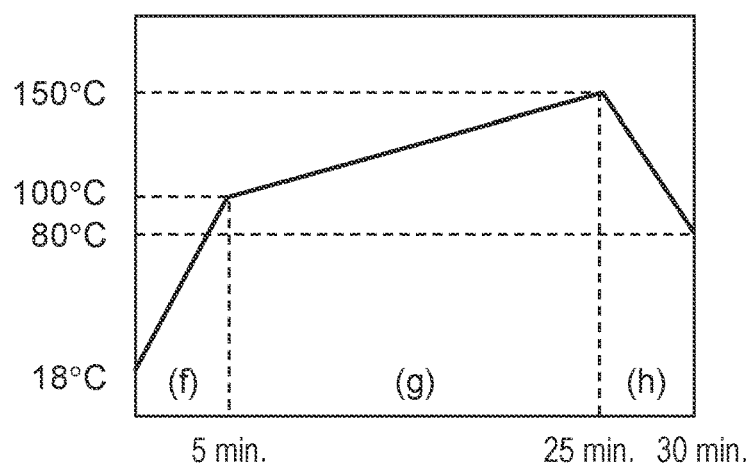
FIG. 3C shows still another temperature profile.

FIGS. 3B and 3C show other examples of the temperature profile. The temperature profile shown in FIG. 3B is for cooking a stew in a pot, such as pot-au-feu. This profile defines performing the following sequential processes: a temperature increasing process (d) and a constant temperature process (e).

In the temperature increasing process (d), control board 106 allows food 104 to be heated for 10 minutes to increase its temperature from room temperature to 95° C. In the constant temperature process (e), control board 106 allows food 104 to be stewed at 95° C. for 30 minutes.

This temperature profile can maintain a nearly boiling temperature to prevent the pot from boiling over or the ingredients falling apart into pieces in the pot.

The temperature profile shown in FIG. 3C is for baking dough for cake, for example. This profile defines performing the following sequential processes: a temperature increasing process (f), a temperature increasing process (g), and a temperature decreasing process (h).

In the temperature increasing process (f), control board 106 allows food 104 to be heated for 5 minutes to increase its temperature rapidly from room temperature to 100° C. In the temperature increasing process (g), control board 106 allows food 104 to be heated for 20 minutes to increase its temperature gradually from 100 to 150° C. In the temperature decreasing process (h), control board 106 allows food 104 to be cooled to 80° C. in 20 minutes.

The cooking defined in this temperature profile is performed using not only microwave source 101 but also an unillustrated radiant heater. This temperature profile can ensure the rising of dough.

When implementing the temperature control of food 104 corresponding to these temperature profiles, control board 106 may change the oscillation frequency of microwave source 101 at a timing different from the timing of adjusting the output of microwave source 101.

Assume, for example, that the cycle of adjusting the output of microwave source 101 is one second, and that the oscillation frequency of microwave source 101 is changed in steps of 10 MHz from 2.405 GHz to 2.495 GHz every 0.1 second. In this case, food 104 can be heated at ten different oscillation frequencies in one cycle of adjusting the output of microwave source 101.

In general, when a microwave is radiated into a closed space such as heating chamber 103, the microwave multi-reflected in the closed space becomes a standing wave, creating a strong electric field region and a weak electric field region. This electric field distribution changes depending on the frequency of the applied microwave.

As described above, the microwave frequency can be adjusted at a cycle shorter than the cycle of adjusting the output of microwave source 101 to equalize the time averages of the electric field distribution. This reduces uneven heating of food 104, thereby improving the quality of cooked food.

In the present exemplary embodiment, the microwave generated by microwave source 101 is radiated into heating chamber 103 through antenna 102. However, antenna 102 may be replaced by a waveguide.

Second Exemplary Embodiment

Figure 4:
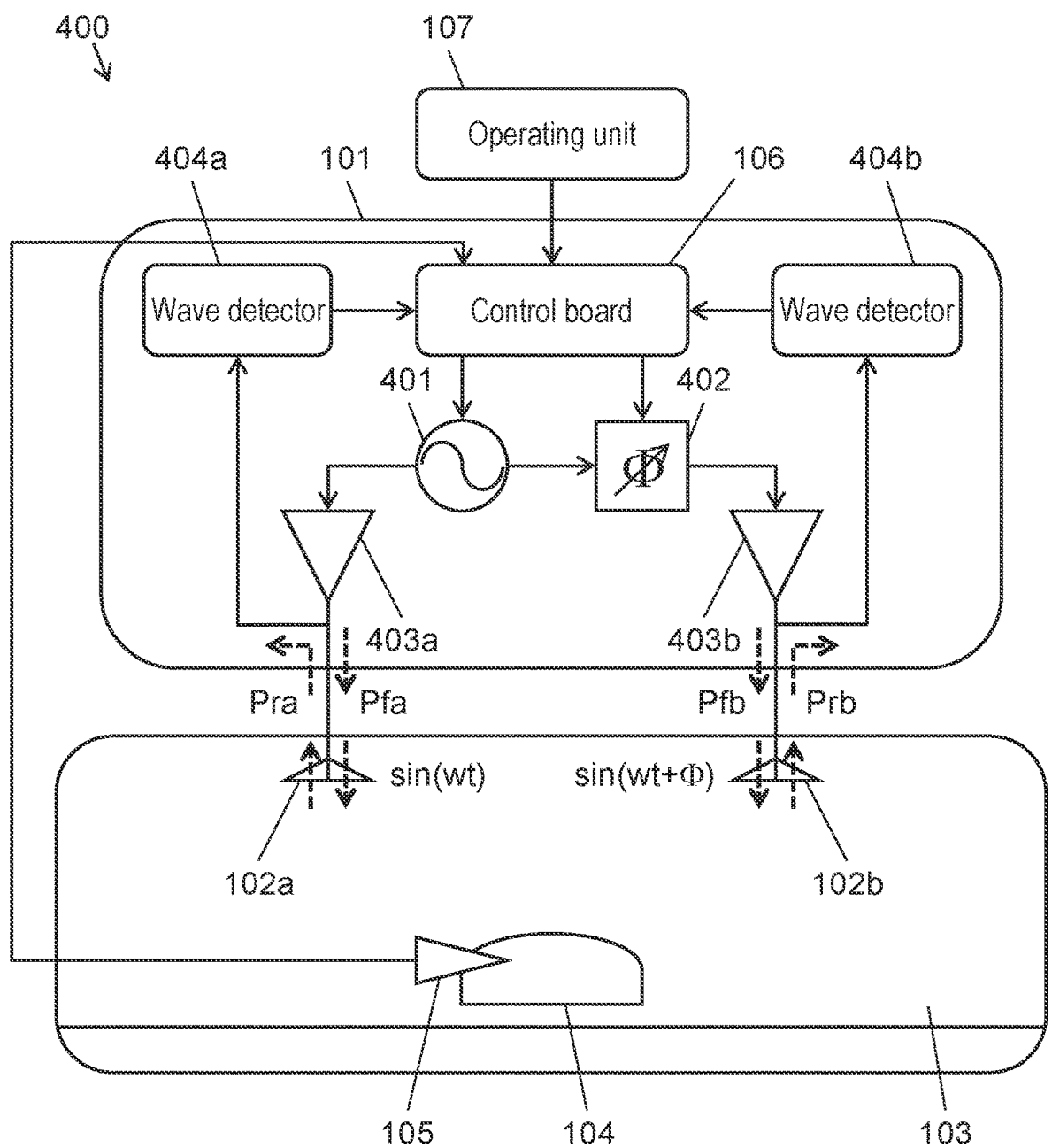
FIG. 4 is a structural block diagram of a high-frequency heating apparatus according to a second exemplary embodiment of the present disclosure.

High-frequency heating apparatus 400 according to a second exemplary embodiment of the present disclosure will now be described as follows. FIG. 4 is a structural block diagram of high-frequency heating apparatus 400. In FIG. 4, components identical to those in the first exemplary embodiment are denoted by the same reference numerals, and the description thereof will be omitted.

In the present exemplary embodiment, the microwave generated by microwave source 101 is radiated into heating chamber 103 through antennas 102a and 102b. In the present exemplary embodiment, antennas 102a and 102b correspond to radiators.

As shown in FIG. 4, microwave source 101 of the present exemplary embodiment includes: oscillator 401; phase shifter 402; amplifiers 403a and 403b; wave detectors 404a and 404b; and control board 106.

Oscillator 401 is the oscillator that is composed of a semiconductor device and that generates the microwave having an adjustable oscillation frequency. Phase shifter 402 controls the microwave phase. Amplifiers 403a and 403b are variable gain amplifiers for amplifying the microwave generated by oscillator 401 to an output value in a permissible range.

Heating chamber 103 includes antenna 102a connected to amplifier 403a, and antenna 102b connected to amplifier 403b.

In the present exemplary embodiment, the microwave generated by oscillator 401 is divided into two parts: one is amplified by amplifier 403a and is radiated into heating chamber 103 by antenna 102a, whereas the other passes through phase shifter 402, is amplified by amplifier 403b, and is radiated into heating chamber 103 by antenna 102b.

The microwave radiated by antenna 102b is adjusted in phase by phase shifter 402, thereby having a different phase from the microwave radiated by antenna 102a.

Wave detector 404a separately detects transmission energy Pfa transmitted from amplifier 403a to antenna 102a and reflection energy Pra returning via antenna 102a. Wave detector 404b separately detects transmission energy Pfb transmitted from amplifier 403b to antenna 102b and reflection energy Prb returning via antenna 102b.

Wave detector 404a functions as a first power detector when detecting the transmission energy Pfa, and functions as a second power detector when detecting the reflection energy Pra. Similarly, wave detector 404b functions as a first power detector when detecting the transmission energy Pfb, and functions as a second power detector when detecting the reflection energy Prb.

The reflection energies Pra and Prb are loss energies not contributing to the heating of food 104. The reflection energies Pra and Prb can be reduced by adjusting the oscillation frequency of oscillator 401 and the amount of phase adjustment of phase shifter 402, thereby improving the efficiency of the energies contributing to the heating.

Figure 5:
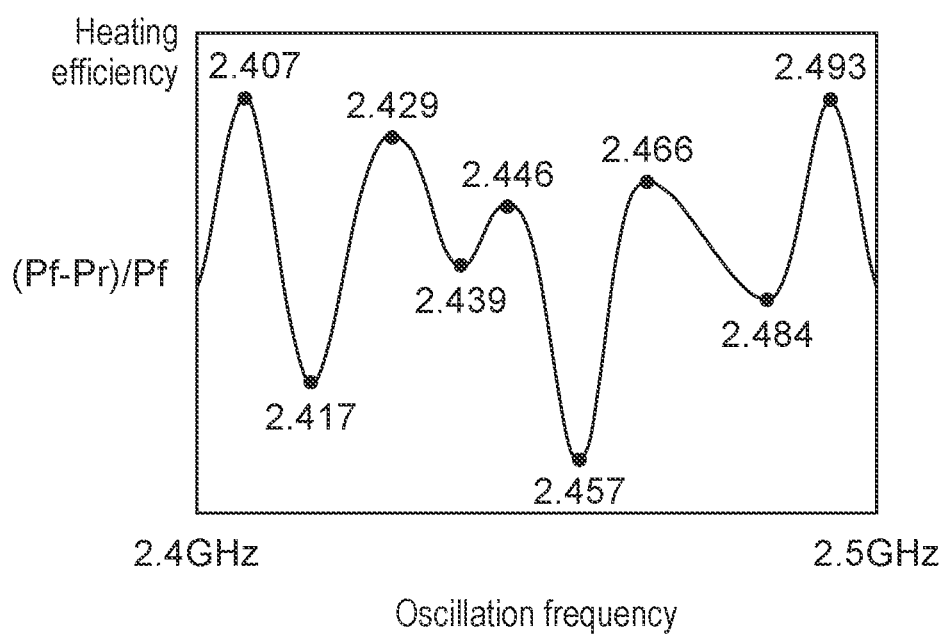
FIG. 5 shows the frequency characteristics of transmission energy and reflection energy in the second exemplary embodiment.

FIG. 5 shows the frequency characteristics of transmission energy Pf and reflection energy Pr in the frequency range of 2.4 GHz to 2.5 GHz. In the graph, (Pf−Pr)/Pf in the vertical axis represents the efficiency of the energies contributing to the heating. The larger the index, the higher the heating efficiency.

As shown in FIG. 5, the frequency range of 2.4 GHz to 2.5 GHz contains comparatively highly efficient frequencies such as 2.407 GHz and 2.493 GHz, and comparatively inefficient frequencies such as 2.417 GHz and 2.457 GHz.

Therefore, in Step S32 of FIG. 2, control board 106 adjusts the oscillation frequency of oscillator 401 before cooking so as to sweep the frequency range of 2.4 GHz to 2.5 GHz in steps of 1 MHz, thereby checking the heating efficiency at each frequency. After this, control board 106 allows cooking to be performed at a microwave whose frequency has the highest heating efficiency. This can reduce the power consumption during cooking.

Selecting a plurality of frequencies with comparatively high heating efficiencies and sequentially using these frequencies during cooking can further improve the heating efficiency and the heating uniformity.

In the case of using a plurality of antennas, the phase difference having the highest heating efficiency can be checked before cooking in the same manner as frequency. To be more specific, control board 106 can control phase shifter 402 to sweep the phase difference between the microwave radiated by antenna 102a and the microwave radiated by antenna 102b from 0° to 360° in steps of 45°, thereby checking the heating efficiency at each phase difference. After this, control board 106 allows cooking to be performed at the phase difference having the highest heating efficiency. This can further reduce the power consumption during cooking.

In the temperature control of food 104 in accordance with the temperature profile, control board 106 may change the amount of phase adjustment of phase shifter 402 at a timing different from the timing of adjusting the output of microwave source 101.

In particular, adjusting the relative phase of two microwaves at a cycle shorter than the cycle of adjusting the output of microwave source 101 will equalize the time averages of the electric field distribution in heating chamber 103 in the same manner as frequency. This reduces uneven heating of food 104, thereby improving the quality of cooked food.

Changing both frequency and phase during cooking can further reduce uneven heating of food 104.

The relation between heating efficiency and oscillation frequency shown in FIG. 5 is one example. This relation not only changes depending on the shape and size of heating chamber 103 and the material and volume of food 104, but also is affected by the temperature change in food 104 during cooking. Hence, the oscillation frequency is preferably reset regularly as well as before starting cooking.

In the first and second exemplary embodiments, food 104 is cooked by microwave heating alone. Alternatively, however, the microwave heating may be combined with radiant heating using, for example, an infrared heater or with convection heating using hot air.

The output value of microwave source 101 can be determined by proportional-integral-differential (PID) control. P control means proportional control. When the difference between the temperature defined in the temperature profile and the actual temperature of food 104 is ΔT, the P control adjusts the output value of microwave source 101 according to the value of ΔT.

I control means integral control. The I control adjusts the output value of microwave source 101 according to the cumulative value of ΔT. D control means differential control. The D control adjusts the output value of microwave source 101 according to the amount of change in ΔT.

To be more specific, the control index is calculated by the formula shown in Mathematical Formula 1. In this formula, Kp, Ki, and Kd are predetermined coefficients. These coefficients should be set suitable for each cooking recipe.

$$\text{The control index} = Kp \times (\Delta Tn) + Ki \times (\Sigma \Delta Tn) + Kd \times (\Delta Tn - \Delta Tn-1) \quad \text{Mathematical Formula 1}$$

INDUSTRIAL APPLICABILITY

The high-frequency heating apparatus according to the present disclosure is applicable not only to cooking and thawing food as described above, but also to other uses such as sterilization by a microwave.

REFERENCE MARKS IN THE DRAWINGS

101 microwave source
102, 102a, 102b antenna
103 heating chamber
104 food
105 temperature sensor
106 control board
107 operating unit
401 oscillator
402 phase shifter
403a, 403b amplifier
404a, 404b wave detector

The invention claimed is:

1. A high-frequency heating apparatus comprising:
   a heating chamber configured to accommodate a load;
   a microwave source configured to generate a microwave, and to adjust a frequency and an output of the microwave;
   at least one radiator configured to radiate the microwave into the heating chamber to heat the load;
   a temperature detector configured to detect a temperature in the heating chamber; and
   a controller configured to cause the microwave source to adjust the output of the microwave, the adjustment being based on (i) the temperature in the heating chamber and (ii) a temperature profile defining a plurality of temperature processes to be performed sequentially, each of the plurality of temperature process defining a temperature change in the load over a time period for the temperature process,
   wherein while the at least one radiator radiates the microwave into the heating chamber to heat the load, the controller causes the microwave source to change the frequency of the microwave to evenly step through each of a plurality of different oscillation frequencies at a predetermined time interval during one cycle of adjusting the output of the microwave such that the load is heated at each of the plurality of different oscillation frequencies for a same amount of time during the one cycle of adjusting the output of the microwave.

2. The high-frequency heating apparatus according to claim 1, further comprising an operating unit configured to receive a selection by a user,
   wherein the controller determines the temperature profile to be implemented based on the selection by the user.

3. The high-frequency heating apparatus according to claim 1, wherein the controller causes the microwave source to change a cycle of adjusting the output of the microwave.

4. The high-frequency heating apparatus according to claim 1, wherein the controller causes the microwave source to adjust the frequency of the microwave at a cycle shorter than a cycle of adjusting the output of the microwave.

5. The high-frequency heating apparatus according to claim 1, further comprising:
   a first power detector configured to detect transmission energy transmitted from the microwave source to the heating chamber; and
   a second power detector configured to detect reflection energy returning from the heating chamber to the microwave source,
   wherein the controller causes the microwave source to adjust the frequency of the microwave based on the transmission energy and the reflection energy.

6. The high-frequency heating apparatus according to claim 1, wherein
   the at least one radiator comprises a plurality of radiators, and
   the microwave source adjusts a relative phase of a plurality of microwaves radiated from the plurality of radiators.

7. The high-frequency heating apparatus according to claim 6, wherein the controller causes the microwave source to adjust the relative phase of the microwaves at a cycle shorter than a cycle of adjusting the output of the microwave.

8. The high-frequency heating apparatus according to claim 6, further comprising:
   a first power detection unit configured to detect transmission energy transmitted from the microwave source to the heating chamber; and
   a second power detection unit configured to detect reflection energy returning from the heating chamber to the microwave source,
   wherein the controller causes the microwave source to adjust the relative phase of the plurality of microwaves based on the transmission energy and the reflection energy.

* * * * *